United States Patent [19]
Rogers

[11] 3,723,831
[45] Mar. 27, 1973

[54] INDIUM ANTIMONIDE INFRARED RAY DETECTOR

[75] Inventor: Cedric G. Rogers, Cincinnati, Ohio

[73] Assignee: Arco Corporation, Cincinnati, Ohio

[22] Filed: Dec. 4, 1970

[21] Appl. No.: 95,164

[52] U.S. Cl. ......317/234 R, 317/235 N, 250/83.3 R, 250/83.3 H

[51] Int. Cl. ..........H01l 15/00

[58] Field of Search .317/235 N; 250/83.3 H, 83.3 R, 250/83 R

[56] References Cited

UNITED STATES PATENTS 3,554,818 1/1971 Lambert..........148/186

*Primary Examiner*—Martin H. Edlow
*Attorney*—Charles M. Hogan

[57] ABSTRACT

The invention is an indium antimonide infrared ray detector which is operable efficiently (i.e., with a maximum black body detectivity) over a wide range of temperatures and at much higher temperatures than heretofore attainable.

3 Claims, 1 Drawing Figure

D* (500, 1000, 1) VERSUS DOPING DENSITY.

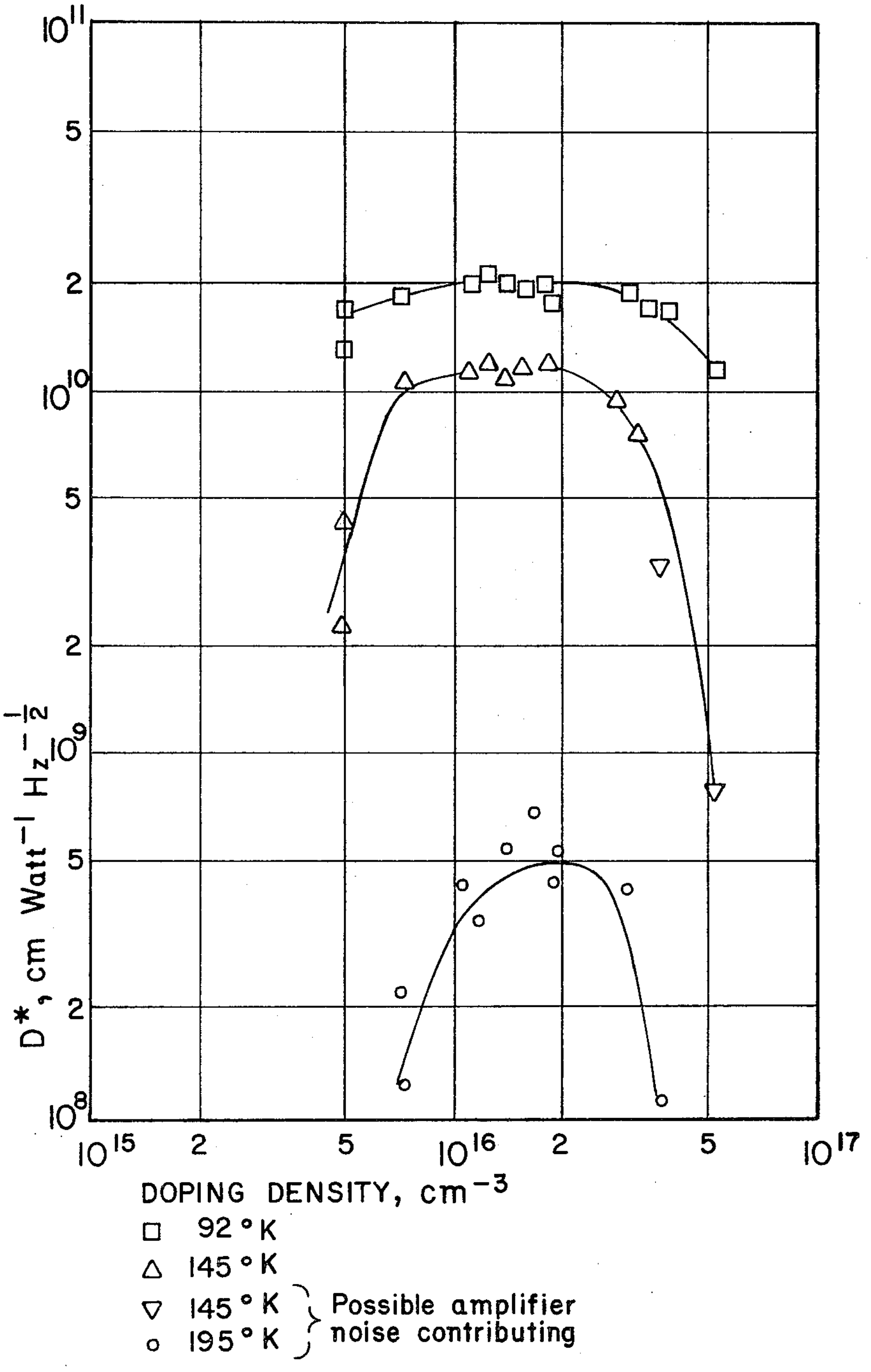
D*(500,1000,1) VERSUS DOPING DENSITY.
*INVENTOR.*
CEDRIC G. ROGERS
*BY* Charles M. Hogan
ATTORNEY

INDIUM ANTIMONIDE INFRARED RAY DETECTOR

PRIOR ART

Detectors of the type to which the invention is applicable and a process for making same are disclosed in application Ser. No. 724,684 of Vernon L. Lambert and Norman J. Gri, entitled "Indium Antimonide Infrared Detector and Process for Making Same", filed Apr. 25, 1968, now U.S. Pat. No. 3,554,818, issued Jan. 12, 1971, and U.S. Pat. No. 3,483,096, dated Dec. 9, 1969, of Norman J. Gri and Eugene T. Yon, both assigned to the same assignee of this application to wit: Avco Corporation.

SUMMARY OF THE INVENTION

The prior art indium antimonide infrared detectors were made with an n-type substrate of indium antimonide and a shallow diffused p-layer consisting of a thin region containing acceptor material such as cadmium or zinc. Such detectors were usually maximized for operation at very low temperatures, of the order of 77°K and used an n-type material doped so that the number of free electrons (doping density) was of the order of 0.8 to 3.1 times $10^{15}$ per cubic centimeter. I have found that by increasing the doping density, at least by the order of 10, I can maximize the sensitivity of such detectors so that they can also operate efficiently at much warmer temperatures thus enabling simpler, less sophisticated and less expensive cryogenic equipment to be used in manufacture of infrared receiving systems.

According to the invention, detectors are made from an n-type substrate consisting of an indium antimonide crystal containing a donor material such as tellurium made by mixing indium and antimony of high purity with tellurium, crystalizing the combined metals in boule form and slicing wafers from the boule.

DESCRIPTION OF THE DRAWING

The chart shown in FIG. 1 of the drawing shows, in rectangular coordinates, the detectivity plotted against doping density for detectors operated at different temperatures and shows in particular that peak performance is obtainable by detectors constructed in accordance with the invention at the comparatively high temperatures of 145°K and 195°K.

DESCRIPTION OF PREFERRED EMBODIMENT OF THE INVENTION

An exemplary embodiment of the invention comprises increasing the doping density of the n-type material of the Lambert and Gri detector within a range of 1.5 to 2.0 times $10^{16}$ per cubic centimeter, resulting in a black body detectivity optimization represented by the parameter symbol D* (500,1000,1) of 1.2 times $10^{10}$ cm watt$^{-1}$ Hz$^{-1/2}$ or greater at 145°K. At 195°K the D* measurement is 5 times $10^{8}$ cm watt$^{-1}$ Hz$^{-1/2}$. For comparison, performance of detectors operating at 92°K also show a D* value of 2 times $10^{10}$ cm watt$^{-1}$ Hz$^{-1/2}$.

Doping density is held within specified limits by incorporating a known amount of tellurium with a mixture of purified Group III metal such as indium and a purified Group V metal such as antimony, and crystallizing the composite material by means already known to the art, as, for example, by the slow drawing of a single crystal boule from a melt whose temperature is carefully controlled. The resulting boule is then sliced into wafers.

DISCUSSION

When InSb diffused junction detectors were operated at 77°K their performance was almost independent of doping density over a range between 1 × $10^{15}$ and 5 × $10^{16}$ per cubic centimeter. Similar performance at 92°K is illustrated in the drawing; however, the limits on doping density signify peak performance occurs over a range of only about 3 × $10^{15}$ to 5 × $10^{16}$ per cubic centimeter. The performance is measured as detectivity or D* which is the signal-to-noise ratio in a unit bandwidth when the incident signal power is unity, normalized for unit detector area. The detector mechanism can be very simply described as a charge carrier being produced for every photon of radiation arriving at the detector surface. There is a maximum possible theoretical value for D* for a photovoltaic detector since it is assumed that all of the noise originates from the random arrival of photons comprising the background radiation.

In practice only a proportion of the photons reaching the detector surface will cause extra charge carriers to be liberated. In presently made detectors this proportion is about 0.6 and this results in detectors having a D* of about 0.77 of the maximum.

The above description of operation assumes that there is no other source of noise within the detector in addition to that caused by the background radiation photons. Other components of noise at 77°K are negligible compared with background radiation. If the background radiation is reduced (for example, by use of cold shielding) the other components of noise may still be negligible. Operating these detectors at higher temperatures showed, however, that the noise from the detector due to other components was no longer negligible but increased sharply with temperature.

The theoretical basis for a detector which would have performance approaching that at 77°K when operated at 145°K will now be discussed.

The noise produced in the detector is dependent on the reverse saturation current, $I_s$, which is proportional to the minority carrier density, $p_n$, on the less doped side of the junction. It can be shown that $n_i$, the intrinsic carrier density, varies in an exponential manner with temperature.

Now $$p_n = n_i^2/N_D)$$

where $N_D$ is the doping density on the less doped n-type side of the junction. Thus $I_s$ may be expected to be inversely proportional to doping density and exponentially dependent on the temperature. For operation at a given temperature the value of $I_s$ is made as low as possible by making $N_D$ as high as possible.

A practical limit is reached since high doping density gives junctions whose reverse breakdown voltage is low. If this breakdown voltage is less than 100 mV it is likely to interfere with the reverse bias capability. This is necessary as minimum noise is found at a slightly reversed bias.

Accordingly I have found that excellent practical results can be accomplished by providing detectors with a doping density within the range 1.5 to 2 × $10^{16}$ per cubic centimeter and as shown in the drawing D* factor greater than 2 × $10^{10}$ cm $Hz^{-1/2}$/w is obtained at 77°K. At 145°K maximum detectivity is also obtained although it is lowered by a factor of 2. Additionally, peak performance is obtained at temperatures as high as 195°K, as shown by the circular coordinates defining the lowermost curve.

Having thus described my invention, I claim:

1. A diffused P-N junction indium antimonide infrared photovoltaic detector comprising an n-type material doped with a donor impurity material providing a doping density within the range of 1.5 to 2 times $10^{16}$ per cubic centimeter, in order to increase detectivity above 92°K.

2. A detector as claimed in claim 1 in which the n-type material comprises a substrate of indium antimonide and said p-region contains a metal selected from Group II B of the periodic table consisting of zinc or cadmium.

3. A detector as claimed in claim 2 in which the n-type material comprises a crystal containing indium, antimony and tellurium as an n-type dopant.

* * * * *